UNITED STATES PATENT OFFICE.

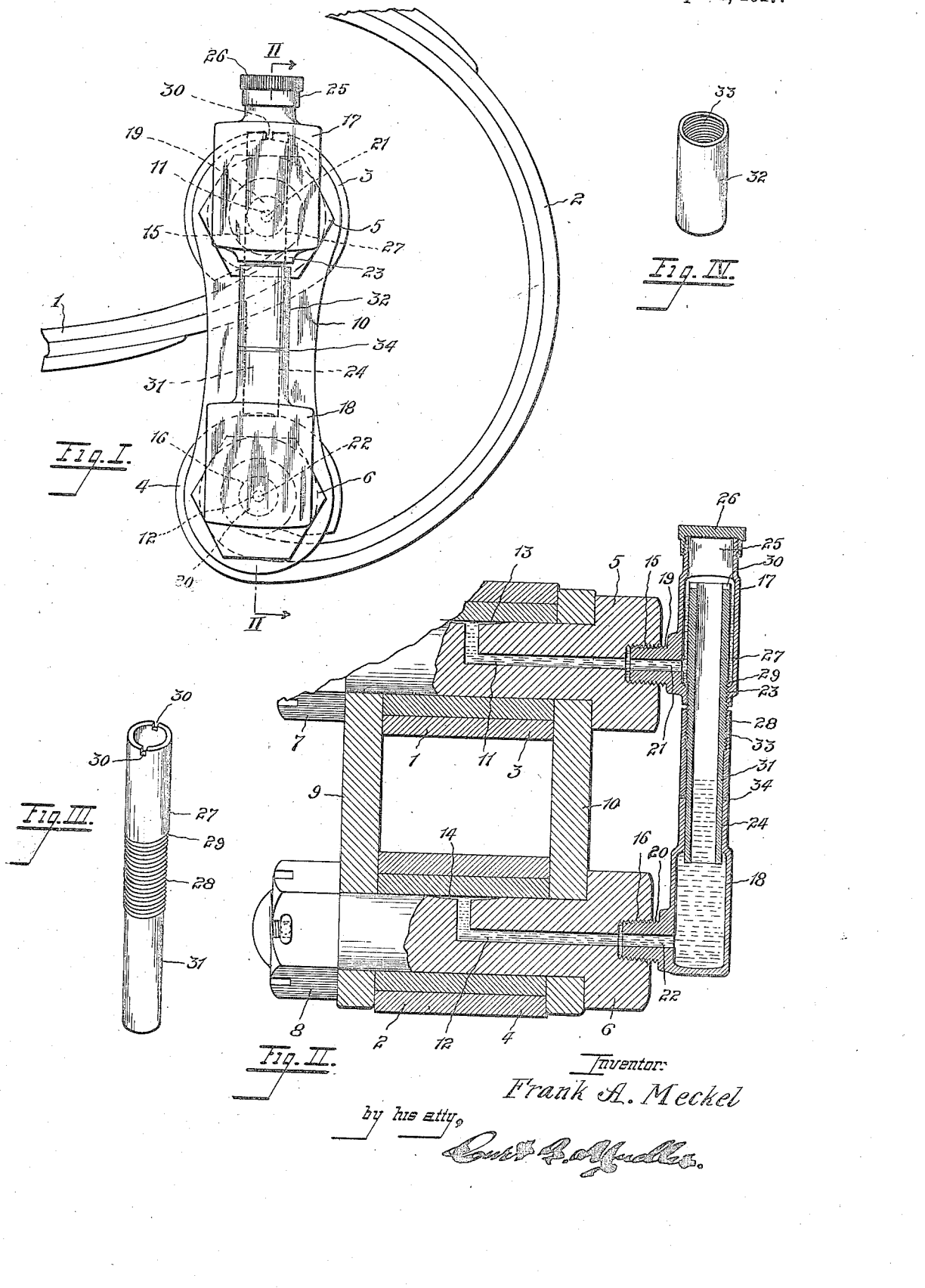

FRANK ALEXANDER MECKEL, OF LAKEWOOD, OHIO.

LUBRICATOR.

1,239,203.  Specification of Letters Patent.  Patented Sept. 4, 1917.

Application filed November 17, 1916. Serial No. 131,809.

*To all whom it may concern:*

Be it known that I, FRANK A. MECKEL, a citizen of the United States, residing at the city of Lakewood, in the county of Cuyahoga and State of Ohio, have invented a new and useful Improvement in Lubricators, of which the following is a specification, the principle of the invention being herein explained and the best mode in which I have contemplated applying that principle, so as to distinguish it from other inventions.

This invention relates to lubricators and more particularly to a duplex construction adapted for connections with shackles such as are commonly employed in vehicle springs of the automobile industry.

I have discovered that noises such as squealing and rattling which are communicated during the flexing of automobile springs are traceable to the lateral rubbing of the shackles with the springs rather than to the interaction of the leaves. It is therefore desirable to effect a continuous and uniform application of lubricant to the shackle and to accomplish this in a simple, durable and feasible manner. Besides this need I have had the general object in view to provide a construction which is sightly in appearance, readily attached or detached and always certain to exercise its intended purpose.

Heretofore, so far as I have become aware, the practice has been to employ a pair of separate oil cups for conducting the lubricant to the bolt bearings at each shackle. These constantly tended and regularly did loosen so that they not only increased the rattle, but functionated unreliably and frequently fell off entirely. Moreover it was necessary to fill each separately with attendant loss of time.

Accordingly, a particular object is to provide a duplex intercommunicating oiling facility for each shackle which will effect a locking connection and prevent the loosening or eventual loss of the reservoirs, and incidentally steady the shackle as a whole and reinforce against lateral vibration at the required movable connections thereof. Another special object is to contrive a structure which is adjustable and capable of being extended or contracted when necessary.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Adverting to the drawing:

Figure I is a side elevation of a pair of spring ends movably connected and additionally provided with a lubricator embodying my invention.

Fig. II is a section on line II—II of Fig. I looking in the direction indicated by the arrows.

Fig. III is a perspective view of one detail; and

Fig. IV is a similar view of another detail.

A pair of spring ends 1 and 2 are provided with superposed hollow scrolls 3 and 4 at their extremities respectively. Inserted through the scrolls 3 and 4 respectively are a pair of spring bolts 5 and 6 adapted to be secured on the opposite sides by castellated nuts 7 and 8 in the usual manner. Movably connecting the bolts 5 and 6 between their heads and the scrolls 3 and 4 are a pair of hangers 9 and 10. Each of the bolts is provided with right angled ducts 11 and 12 respectively, which include upward extensions terminating in grooves 13 and 14 about midway of the bearing surface afforded between the bolts and the scrolls as is clearly shown in Fig. II. Where the ducts 11 and 12 emerge through the bolt heads they are tapped to somewhat greater size as is seen at 15 and 16. So much as has been already described is common to the art.

The lubricator embodying the features of my invention is a unitary structure adapted to supply the lubricant through both of the ducts 11 and 12 and incidentally achieve marked advantages when the shackle connection between the spring ends is functionating. I employ a pair of reservoirs 17 and 18 having projections 19 and 20 adapted to have pipe thread connections with the openings 15 and 16 respectively. Intercommunicating outlet ducts 21 and 22 are provided as is also apparent from an inspection of Fig. II. The upper reservoir 17 has a lower screw threaded opening 23 and the lower reservoir 18 has an upper plain opening 24. The upper reservoir 17 has an upper screw threaded inlet adapted to be closed by a cap 26 and the opening 25 is somewhat larger in bore than the opening 23. A tube 27 is provided intermediately of its ends with exterior screw threads 28 which terminate at one end against a shoulder 29 of the upper larger portion of the tube. This latter is provided in its upper extremity with a pair of slots 30 into which a screw driver may be inserted for a purpose to be later explained. The other end of the tube 27 is of lesser diameter than the threads 28 and is smooth. As so constructed the tube 27 is adapted for insertion through the inlet 25, while its threads coact with the threaded opening 23 and its end 31 has a telescopic fit with the opening 24. In this way the reservoirs 17 and 18 are so connected that lubricating fluid may be supplied to both through the inlet 25 upon removal of the cap 26. A collar 32 is provided at one end with interior screw threads 33 adapted to co-act with the screw threads 28, so that its other end may be caused to approach or recede from a fiber washer 34 interposed between it and the upper edge of the opening 24. By this means the spacing between the reservoir 17 and 18 may be adjusted according to the length of the collar 32 and a tight connection may be had at the upper end of the telescopic connection with the lower reservoir to preclude seepage at that point. It will be noticed moreover that the upper larger end of the tube 27 extends a considerable distance across the reservoir 17 for the purpose of preventing the gravitational tendency of the lower reservoir to drain the upper.

In attaching my lubricator the reservoir 18 is firmly seated in the bolt 6 and the reservoir 17 in the bolt 5. Thereafter, the tube 27 is inserted down through the opening 25 and also through the opening 23 until the threads 28 engage with the threads in such opening. Before the openings 23 and 24 are brought into line the collar 32 is slipped over the lower extremity 31 of the tube and then the whole brought into line. Thereafter the tube 27 may be turned by a screw driver until the shoulder 29 impinges against the bottom of the reservoir 17. In this manner the height of the top of the tube 27, with reference to the interior of the reservoir 17, is established according to predetermined expediency. In the meantime the lower end 31 will have entered the opening 24 and thus effectually hinder any further rotatory movement on the part of the reservoirs 17 and 18 relative to the bolts. Moreover, the tipping of the reservoirs is thereby prevented and by reason of the firm anchorage of the lubricator, as a whole in the bolts, the shackle is measurably stiffened and enabled to resist wrenches and lateral vibration. It is apparent that the oil in the upper reservoir is trapped below the upper end of the tube 27, so that it may be drained only through the duct 11.

In order for the tube 27 to reach the limit of its downward movement the threads 33 on the collar 32 must have been first caused to engage and moved upwardly along the tube 27. Finally the collar 32 is again screwed downwardly until it tightly engages the washer 34 and thus prevents seepage past the connection at such point. When shock absorbers are employed it may become necessary to allow of relative movement between the reservoirs 17 and 18 and in such event the collar 32 may be either entirely dispensed with or made shorter than the normal spacing between the lower edge of the opening 23 and the upper edge of the opening 24.

My invention incidentally coacts with the felt lining of spring covers in such a way that oil which can only seep out, between the hangers and the scrolls, is necessarily conducted to such felt.

I claim:—

1. A lubricator comprising the combination with a pair of shackle bolts, of a pair of reservoirs and an adjustable connection therebetween.

2. A lubricator comprising the combination with a vehicle spring attachment, of a pair of reservoirs each provided with an outlet leading to such attachment and a hollow expansible connection therebetween.

3. A lubricator comprising a pair of reservoirs each provided with an outlet, a duct connecting said reservoirs, and means for varying the length of said duct, one of said reservoirs being also provided with an inlet.

4. A lubricator comprising a pair of reservoirs each provided with an outlet, a duct connecting said reservoirs and extending partly across the interior of one, means for varying the length of said duct, one of said reservoirs being also provided with an inlet, and a cap for said inlet.

5. A lubricator comprising the combination with a vehicle spring, of a pair of reservoirs each having an outlet, and a hollow telescopic connection therebetween, whereby to permit of relative action.

6. A lubricator comprising a pair of superposed reservoirs each having a laterally directed outlet, the upper of said reservoirs being further provided with a top inlet, and a duct connecting said reservoirs and communicating with the upper one near its inlet for the purpose specified.

7. A lubricator comprising a pair of reservoirs arranged one above the other and each provided near its bottom with a screw threaded lateral outlet, the upper reservoir being additionally provided with a capped inlet, and a hollow connection between said reservoirs adapted to permit of relative movement therebetween.

8. A lubricator comprising the combination with a linked shackle, of a pair of reservoirs, hollow connections between said reservoirs and the bearings of said shackle respectively, and an expansible connection between said reservoirs whereby to permit of relative movement in unison with the action of said shackle.

9. A lubricator comprising the combination of a pair of supports, one of which is movable relative to the other, a hanger connection therebetween, and a distinct lubricating device also connecting said members and adapted to reinforce and control the hanger connection.

10. A lubricator comprising the combination of a vehicle support, a spring, bolts carried by said support and spring respectively, a pair of hangers articulating with said bolts, and a lubricating device rigidly connected with each of said bolts and adapted to resist lateral vibration at the points of connection of the hangers therewith.

11. A lubricator comprising the combination of a pair of relatively movable supports, a hollow bolt passed through each of said supports, a hanger connection articulating with said bolts, and a hollow lubricating device rigidly connected with said bolts and having communication therethrough, said device being adapted to resist disalining of said hanger connection.

12. A lubricator comprising the combination of a pair of supports, hollow bolts passed therethrough, hangers connecting said bolts, and a distinct lubricating device having a hollow container attached for communication through each of said bolts.

13. A lubricator comprising the combination of a pair of supports, hollow bolts passed therethrough, hangers connecting said bolts, a lubricating device including a pair of reservoirs connected with said bolts respectively and a hollow connection between said reservoirs and movable relatively thereto for the purpose specified.

14. A lubricator comprising the combination with a vehicle spring connection of a pair of superposed reservoirs and a hollow adjustable connection therebetween having communication with the upper of said reservoirs a given distance above the bottom thereof.

15. A device of the character described comprising in combination with a pair of shackled supports, of a lubricator also extending between and firmly attached at said supports, said lubricator including hollow parts communicating with and movable relatively to each other.

16. A device of the character described comprising in combination with a vehicle spring shackle of a lubricator firmly connected at opposite ends of said shackle and including parts which are relatively movable in such a way as to permit of movement of the shackle in one direction and to resist tendencies to move it in another direction.

17. A device of the character described comprising in combination with a pair of bolts shackled together and adapted to move relative to each other, of a lubricator fixed to said bolts and having parts movably connected, the arrangement being such that the tendency of the bolts to become tilted relative to each other is resisted.

Signed by me, this 10th day of November, 1916.

FRANK ALEXANDER MECKEL.

Copies of this patent may be obtained for five cents each, by addressing the "Commissioner of Patents, Washington, D. C."